US008327670B2

(12) United States Patent
Maekawa et al.

(10) Patent No.: US 8,327,670 B2
(45) Date of Patent: Dec. 11, 2012

(54) MOTOR CONTROLLER AND DRUM WASHING MACHINE

(75) Inventors: Sari Maekawa, Yokohama (JP); Tsuyoshi Hosoito, Seto (JP)

(73) Assignees: Kabushiki Kaisha Toshiba, Tokyo (JP); Toshiba Consumer Electronics Holdings Corporation, Tokyo (JP); Toshiba Home Appliances Corporation, Tokyo (JP)

( * ) Notice: Subject to any disclaimer, the term of this patent is extended or adjusted under 35 U.S.C. 154(b) by 323 days.

(21) Appl. No.: 12/635,130

(22) Filed: Dec. 10, 2009

(65) Prior Publication Data

US 2010/0139333 A1 Jun. 10, 2010

(30) Foreign Application Priority Data

Dec. 10, 2008 (JP) .................................. 2008-314423

(51) Int. Cl.
*D06F 33/00* (2006.01)

(52) U.S. Cl. ........................ 68/12.02; 68/12.27; 318/701

(58) Field of Classification Search ................. 68/12.02, 68/12.12, 12.27; 318/701
See application file for complete search history.

(56) References Cited

U.S. PATENT DOCUMENTS

| 5,650,706 | A | * | 7/1997 | Yamada et al. | 318/701 |
|---|---|---|---|---|---|
| 6,163,912 | A | * | 12/2000 | Matsuura et al. | 8/159 |
| 6,720,792 | B2 | * | 4/2004 | Raftari et al. | 324/765.01 |
| 6,737,828 | B2 | * | 5/2004 | Kiuchi et al. | 318/779 |
| 7,075,266 | B2 | * | 7/2006 | Tobari et al. | 318/400.02 |
| 7,531,982 | B2 | * | 5/2009 | Okamura et al. | 318/701 |
| 7,855,526 | B2 | * | 12/2010 | Ohnishi et al. | 318/800 |
| 2006/0119312 | A1 | | 6/2006 | Okamura et al. | |
| 2009/0237014 | A1 | * | 9/2009 | Yamada | 318/400.02 |
| 2010/0090640 | A1 | | 4/2010 | Maekawa et al. | |

FOREIGN PATENT DOCUMENTS

| DE | 102 43 217 A1 | 5/2003 |
|---|---|---|
| DE | 10 2006 006 824 A1 | 8/2007 |
| JP | 2004-343822 | 12/2004 |
| JP | 2005-192325 | 7/2005 |
| JP | 2006-280195 | 10/2006 |
| JP | 2007-215369 | * 8/2007 |
| JP | 2009-118663 | 5/2009 |
| JP | 2010-98813 | 4/2010 |

OTHER PUBLICATIONS

European Patent Office 0 156 282 Oct. 1985.*
Office Action issued Feb. 15, 2011 in Japanese Patent Application No. 2008-314423 (with English translation).
German Office Action issued Mar. 30, 2012, in Patent Application No. 10 2009 057 433.6 (with English-language translation).

* cited by examiner

*Primary Examiner* — Frankie L Stinson
(74) *Attorney, Agent, or Firm* — Oblon, Spivak, McClelland, Maier & Neustadt, L.L.P.

(57) ABSTRACT

A motor controller including a vector controller that controls a permanent magnet motor including a rotor being provided with a permanent magnet having a coercivity low enough to allow modification in amount of magnetization and that executes a vector control by detecting current flowing at the permanent magnet motor; a speed/position detector that detects a rotational speed and a rotational position of the permanent magnet motor; a magnetization controller that increases or decreases the magnetization of the permanent magnet depending on the rotational position of the permanent magnet motor through adjustment in status of the magnetization of the permanent magnet by way of armature counteraction; and a demagnetization detector that detects a decrease in the magnetization of the permanent magnet magnetized by the magnetization controller during operation of the permanent magnet motor.

20 Claims, 11 Drawing Sheets

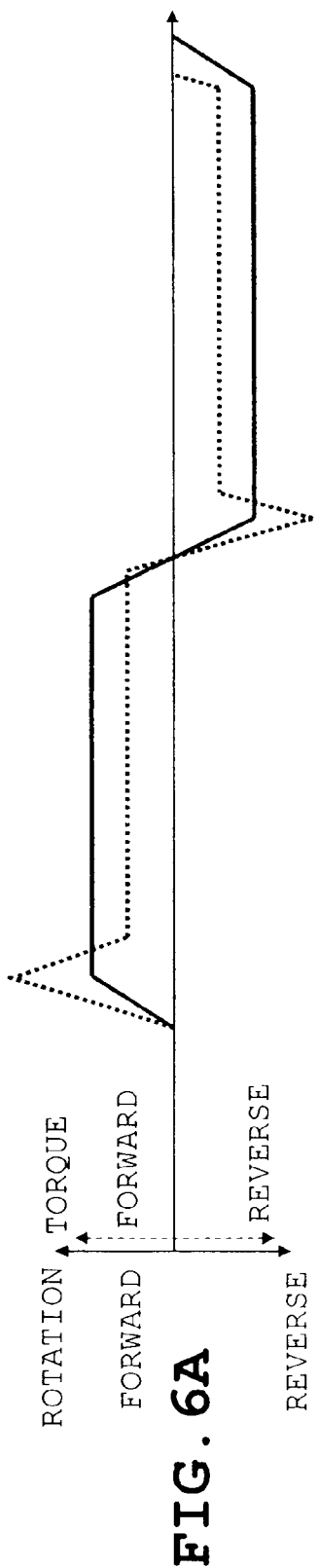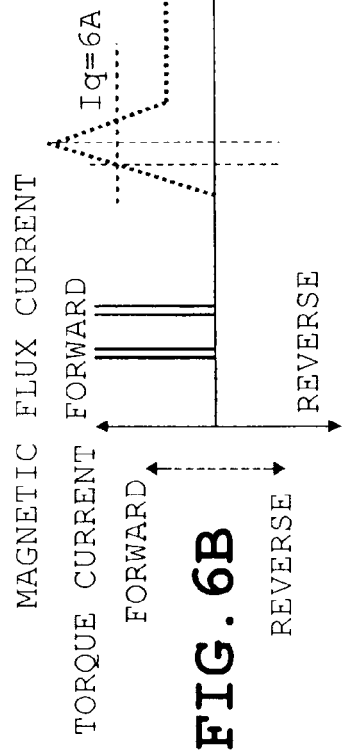

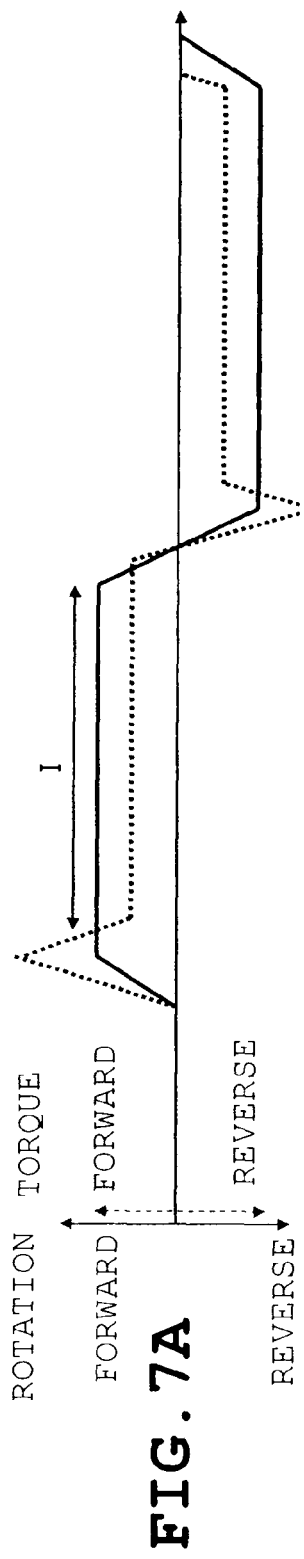
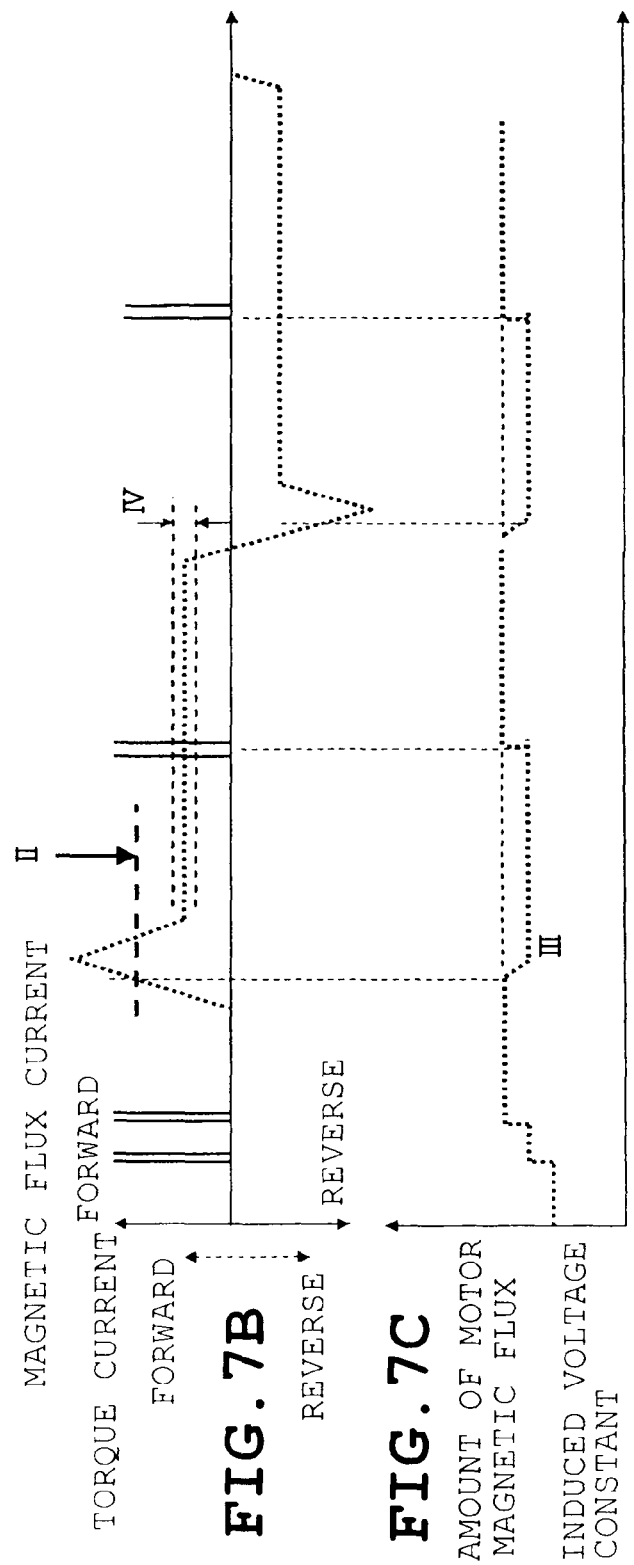
FIG. 7A, FIG. 7B, FIG. 7C

| EXAMPLE WHEN LAUNDRY=4kg | | | | | |
|---|---|---|---|---|---|
| STEP | OPERATION | | | | RE-MAGNETIZATION |
| | FORWARD ROTATION | STOP TIME | REVERSE ROTATION | STOP TIME | |
| SUPPLY WATER /AGITATE | 5.2sec 42rpm | 10sec | 5.2sec 42rpm | 10sec | PROHIBITED |
| FIRST WASH | 20sec 47rpm | 1sec | 20sec 47rpm | 1sec | PERMITTED |
| SECOND WASH | 4sec 30rpm | 2sec | 4sec 30rpm | 2sec | PROHIBITED |
| DRAIN | 5sec 47rpm | 1sec | 5sec 47rpm | 1sec | PROHIBITED |
| RINSE&AGITATE 1 | 5sec 42rpm | 10sec | 5sec 42rpm | 10sec | PROHIBITED |
| RINSE&AGITATE 2 | 5sec 42rpm | 10sec | 5sec 42rpm | 10sec | PROHIBITED |

FIG.8A

| EXAMPLE WHEN LAUNDRY=9kg | | | | | |
|---|---|---|---|---|---|
| STEP | OPERATION | | | | RE-MAGNETIZATION |
| | FORWARD ROTATION | STOP TIME | REVERSE ROTATION | STOP TIME | |
| SUPPLY WATER /AGITATE | 10sec 40rpm | 10sec | 10sec 40rpm | 10sec | PERMITTED |
| FIRST WASH | 20sec 45rpm | 1sec | 20sec 45rpm | 1sec | PERMITTED |
| SECOND WASH | 20sec 35rpm | 1sec | 20sec 35rpm | 1sec | PERMITTED |
| DRAIN | 5sec 55rpm | 5sec | 5sec 55rpm | 5sec | PROHIBITED |
| SUPPLY WATER | 10sec 40rpm | 10sec | 10sec 40rpm | 10sec | PERMITTED |
| RINSE&AGITATE 1 | 20sec 40rpm | 1sec | 20sec 40rpm | 1sec | PERMITTED |
| SUPPLY WATER | 10sec 40rpm | 10sec | 10sec 40rpm | 10sec | PERMITTED |
| RINSE&AGITATE 2 | 20sec 40rpm | 1sec | 20sec 40rpm | 1sec | PERMITTED |

FIG. 8B

MOTOR CONTROLLER AND DRUM WASHING MACHINE

CROSS-REFERENCE TO RELATED APPLICATIONS

This application is based upon and claims the benefit of priority from the prior Japanese Patent Application 2008-314423, filed on, Dec. 10, 2008 the entire contents of which are incorporated herein by reference.

FIELD

The present disclosure relates to a motor controller that controls a permanent magnet motor having a permanent magnet provided at its rotor, more specifically, a permanent magnet having coercivity low enough to allow modification in its amount of magnetism. The motor controller executes a field oriented control by detecting the current flowing in the motor. The present disclosure also relates to a drum washing machine that executes wash by rotating the drum by the permanent magnet motor.

BACKGROUND

One of the mainstream approaches employed in recent washing machines is a field oriented control or a vector control of the motor to rotate the drum by direct drive method. The above described configuration provides improved rotation accuracy which in turn yields improved wash performance as well as reduced vibration and noise during the operation of the washing machine. Under the above described configuration, when the drum is rotated at high speed, for instance, for dehydration, d-axis current which does not contribute to torque output is energized to execute a field weakening control that reduces induced voltage occurring at the stator winding. One of the problems encountered in field weakening control is increased copper loss caused by energization of d-axis current, which inevitably reduces the motor drive efficiency.

One of the approaches for addressing such problem is disclosed for example in JP 2008-266386 A in which permanent magnets having low coercivity are disposed on the rotor side of a 48 pole 36 slot configuration motor and the permanent magnet is demagnetized by momentarily energizing the stator winding with large current. The reduction in magnetic flux of the permanent magnet reduces the induced voltage produced at the motor to allow high speed operation without executing a field weakening control. One example of a permanent magnet motor employing the above described structure is disclosed in JP 2006-280195 A.

However, it has been found that the attempt to modify the amount of magnetization in the above described manner caused magnetization/demagnetization of the permanent magnet from time to time depending upon the structure of the motor even when q-axis current is energized for the purpose of generating torque. FIG. 10 indicates the measurement of magnetization. First, the permanent magnet is magnetized to execute a wash operation with a washing machine such that 43 volts of induced voltage is generated. When wash operation is executed under such state and winding current is energized to approximately 10 A during the wash operation, demagnetization was observed in which induced voltage generated by the motor was reduced to 38V. The induced voltage showed a variance ranging from 34V to 42V in the range of ±10 A as indicated in FIG. 10.

To elaborate on the above findings, when current of approximately 10 A is energized when outputting torque, current for magnetizing and demagnetizing the permanent magnet in equal amounts is flown in the level of ±10 A which causes the permanent magnet in magnetized state to be demagnetized to approximately 34V of induced voltage, and the permanent magnet in demagnetized state to be magnetized to approximately 42V of induced voltage. Because this happens alternately when q-axis voltage is energized, magnetization is consequently stabilized at an intermediate voltage of approximately 38V as described earlier.

Because the wash operation of the washing machine requires high torque output, generation of relatively greater amount of induced voltage is desirable. However, when permanent magnet is demagnetized by the energization of q-axis current, greater amount of q-axis current needs to be energized to obtain the desired torque, which consequently increases electricity consumption.

SUMMARY

One of the advantages of the present invention is providing a motor controller that allows recovery in magnetization even when the permanent magnet is unintentionally demagnetized during motor operation and a drum washing machine provided with such motor controller.

In one aspect of the present invention, there is provided a motor controller including a vector controller that controls a permanent magnet motor including a rotor being provided with a permanent magnet having a coercivity low enough to allow modification in amount of magnetization and that executes a vector control by detecting current flowing at the permanent magnet motor; a speed/position detector that detects a rotational speed and a rotational position of the permanent magnet motor; a magnetization controller that increases or decreases the magnetization of the permanent magnet depending on the rotational position of the permanent magnet motor through adjustment in status of the magnetization of the permanent magnet by way of armature counteraction; and a demagnetization detector that detects a decrease in the magnetization of the permanent magnet magnetized by the magnetization controller during operation of the permanent magnet motor.

According to the above described motor controller, the magnetization controller, when the demagnetization controller detects the decrease in the magnetization of the lower coercivity permanent magnet magnetized by the magnetization controller during operation of the permanent magnet motor, re-magnetizes, in other words, increases the magnetization of the permanent motor by recuperating the magnetic force of the permanent magnet.

In one aspect of the present invention, there is provided a drum washing machine including a permanent magnet motor including a rotor being provided with a permanent magnet having a coercivity low enough to allow modification in amount of magnetization; a vector controller that controls the permanent magnet motor and that executes a vector control by detecting current flowing at the permanent magnet motor; a speed/position detector that detects a rotational speed and a rotational position of the permanent magnet motor; a magnetization controller that increases or decreases the magnetization of the permanent magnet depending on the rotational position of the permanent magnet motor through adjustment in status of the magnetization of the permanent magnet by way of armature counteraction; and a demagnetization detector that detects a decrease in the magnetization of the permanent magnet magnetized by the magnetization controller during operation of the permanent magnet motor; wherein a washing operation is executed by rotating a drum containing laundry by a rotational drive force generated by the permanent magnet motor.

According to the above described drum washing machine, even if the permanent magnet of the permanent magnet motor is demagnetized during the washing operation, the magnetic force of the permanent magnet can be recuperated to allow the washing operation and other operations to continue without degradation in efficiency.

BRIEF DESCRIPTION OF THE DRAWINGS

FIG. 6A indicates count of rotation and torque;

FIG. 6B indicates transition of torque current Iq during a wash operation;

FIG. 6C indicates transition of magnetic flux of the permanent magnet motor;

FIGS. 7A, 7B, and 7C indicate the sequence of recovery through re-magnetization;

FIGS. 8A and 8B are charts indicating one example of cases where re-magnetization of the permanent magnet is permitted;

DETAILED DESCRIPTION

Figure 1:
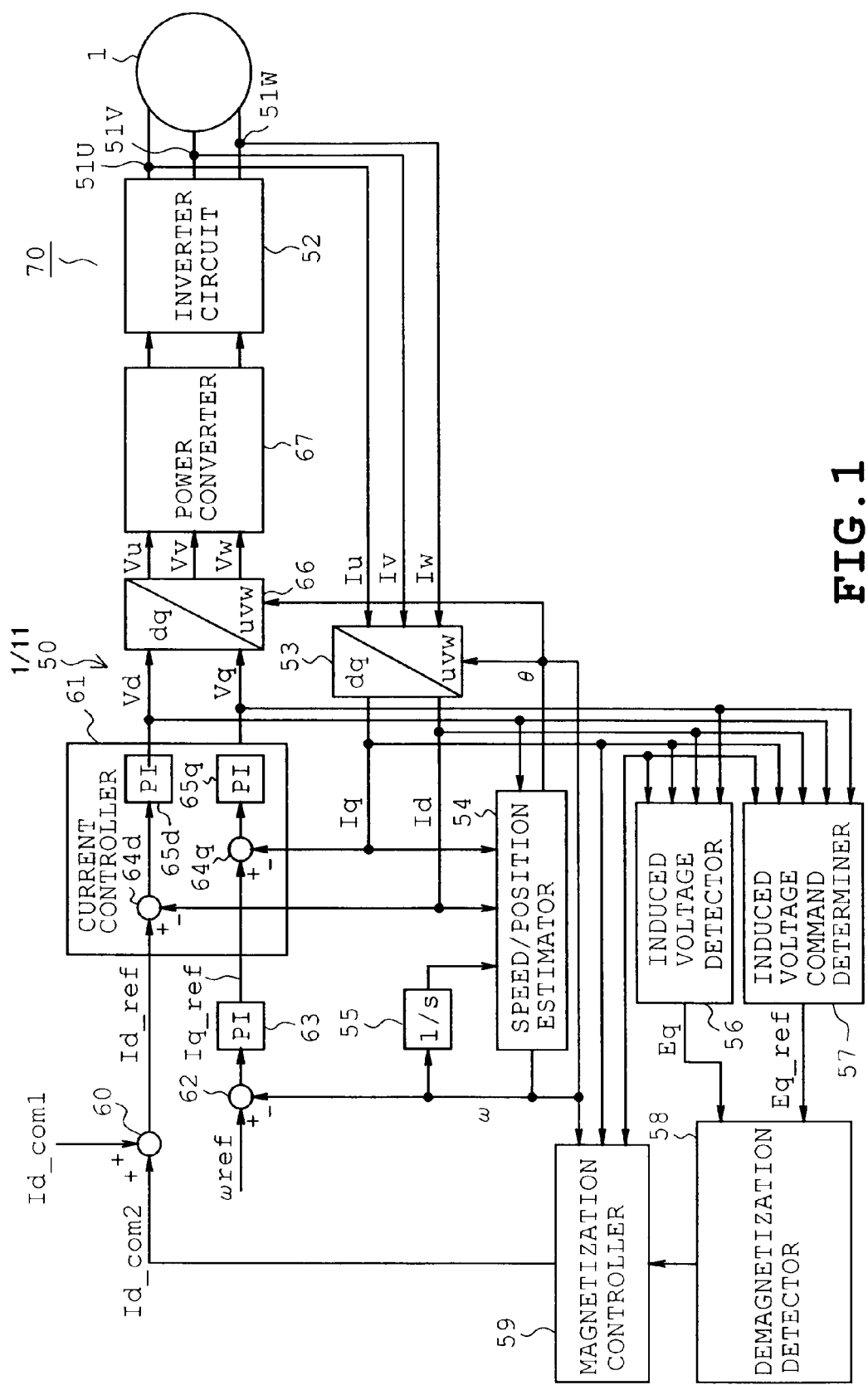
FIG. 1 is a functional block diagram of an electrical configuration of a motor controller according to a first exemplary embodiment of the present invention.

A first exemplary embodiment of the present invention will be described hereinafter with reference to FIGS. 1 to 8B. FIG. 2A is a plan view depicting the rotor configuration of permanent magnet motor 1 of an outer rotor brushless type and FIG. 2B is a corresponding partial perspective view. The features of permanent magnet motor 1 are similar to those of the motor disclosed in JP 2006-280195 A except for its outer rotor configuration.

Permanent magnet motor 1 includes stator 2 and rotor 3 provided at the outer periphery of stator 2. Stator 2 comprises stator core 4 and stator winding 5. Stator core 4 is made of laminated layers of blanked silicon steel sheets that are magnetically soft. The laminated silicon steel sheets are secured together by caulking. Stator core 4 includes an annular yoke 4a and a multiplicity of teeth 4b extending radially from the outer periphery of yoke 4a. The surface of stator core 4 is coated by a mold resin such as PET resin except for outer peripheral surface 4c or the tip surfaces of teeth 4b that confront the inner peripheral surface of rotor 3 over a gap.

At the inner periphery of stator 2, a plurality of mounts 6 are molded integrally that are made of PET resin. Mounts 6 are provided with a plurality of screw holes 6a for screw fastening mount 6 so that stator 2 is secured on the rear surface of tub 25 of drum washer dryer 21 shown in FIG. 3. Stator winding 5 comprises a three-phase winding and is wound on to each of teeth 4b.

Rotor 3 is integrally structured by frame 7, rotor core 8, and a plurality of permanent magnets 9 molded by a mold resin not shown. Frame 7 is made of magnetic material such as a steel sheet pressed into a form of a flat bottom cylinder. Rotor core 8 comprises soft magnetic silicon steel sheets blanked in substantially annular form that are laminated and caulked together. Rotor core 8 is disposed on the inner periphery of frame 7. The inner peripheral surface of rotor core 8 which confronts the outer peripheral surface of stator 2 or the stator core 4 over a gap is contoured by a plurality of protrusions 8a oriented inward and protruding circumferentially.

Protrusions 8a have a rectangular insert hole 13 defined on them that run in the axial direction of rotor core 8 or the direction of lamination of the silicon steel sheets so as to penetrate protrusions 8a. Insert holes 13 comprise insert holes 13a and 13b that differ in their widths of the shorter sides and are situated alternately along the circumference of rotor core 8.

Permanent magnet 9 comprises a rectangular neodymium magnet 9a which is a high coercivity magnet inserted into insert hole 13a and a rectangular alnico magnet 9b which is a low coercivity magnet inserted into insert hole 13b. The coercivity of neodymium magnet 9a is approximately 900 kA/m which is as much as nine times the coercivity of alnico magnet 9b which is approximately 100 kA/m. To summarize, permanent magnet 9 is configured by two types of permanent magnets 9a and 9b that differ in coercivity and that are arranged alternately in a substantially annular layout within rotor core 8.

The evaluation of coercivity of neodymium magnet 9a being high and alnico magnet 9b being low is based upon a relative comparison in that neodymium magnet 9a does not change its amount of magnetism when exposed to electric current in the magnitude that would change the amount of magnetism of alnico magnet 9b upon energization of magnetizing current through stator 2.

Further, each of the two types of permanent magnets 9a and 9b represent a magnetic pole and are each disposed so that their direction of magnetization are oriented along the radial direction of permanent magnet motor 1, in other words, in the direction oriented from the outer peripheral portion of permanent magnet motor 1 to the gap residing between stator 2 and rotor 3. When the two types of permanent magnets 9a and 9b are disposed alternately and oriented such that their direction of magnetization are oriented along the radial direction, the magnetic poles of the permanent magnets 9a and 9b disposed adjacent to the other reside in opposite directions, meaning that the N-pole of either of the magnet types resides in the inner side and the N-pole of the remaining other magnet type resides in the outer side. As a result, a path of magnetism, in other words, magnetic flux is generated between neodymium magnets 9a and alnico magnets 9b in the direction indicated by arrow B in FIG. 2B.

The arrow represented by broken line at the upper portion of FIG. 2B indicates the direction in which the magnetic flux passes through rotor core 8. This means that magnetic path is formed so as to pass through both neodymium magnet 9a having relatively greater coercivity and alnico magnet 9b having less coercivity. Permanent magnet motor 1 takes a 48 pole 36 slot configuration which can also be described as 4 pole 3 slot meaning that 4 poles are associated with 3 slots.

Figure 3:
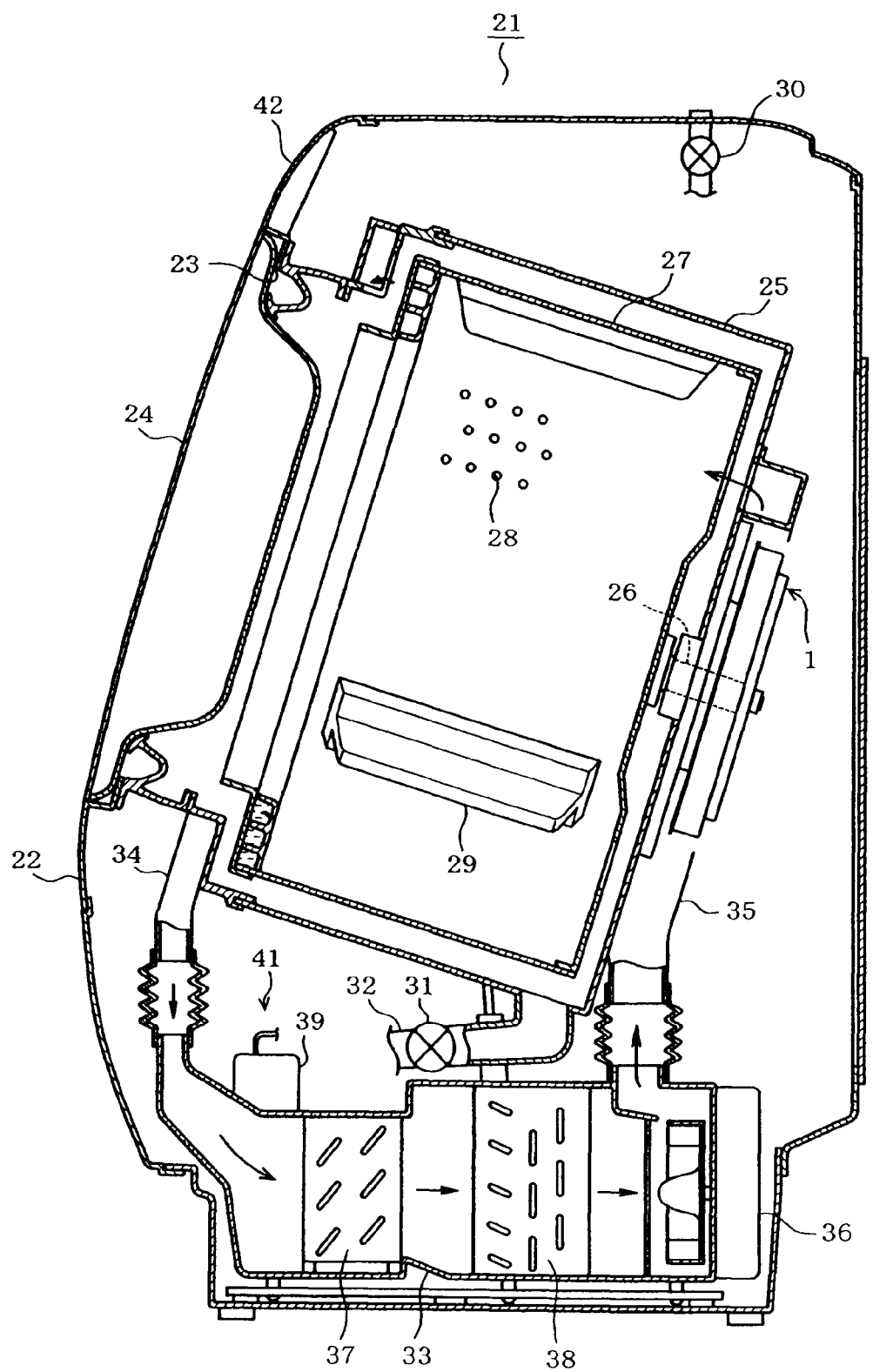
FIG. 3 is a vertical cross sectional side view of a drum washer dryer.

Next, a description will be given on a drum washer dryer 21 provided with the above described permanent magnet motor 1. FIG. 3 is a vertical cross sectional side view schematically describing the interior configuration of drum washer dryer 21. Exterior housing defining the outline of drum washer dryer 21 has a round opening 23 defined on its front face for loading and unloading of laundry. Opening 23 is opened/closed by door 24. Exterior housing 22 contains a cylindrical water tub 25 having enclosed bottom and a rear side surface. On the central rear surface of water tub 25, the above described permanent magnet motor 1, more specifically, stator 2 is screw fastened.

Permanent magnet motor 1 has a rotary shaft 26 having its rear end, the right side end as viewed in FIG. 3, secured on mount 10 of permanent magnet motor 1, more specifically, rotor 3 and its front end, the left side as viewed in FIG. 3, protrudes into water tub 25. At the front end of rotary shaft 26, a cylindrical drum 27 having an enclosed bottom and rear surface is secured so as to be coaxial with water tub 25 and drum 27 is driven in rotation integrally with rotor 3 and rotary shaft 26 by permanent magnet motor 1. Drum 27 is provided with a plurality of through holes 28 allowing airflow and water flow to pass through them and a plurality of baffles 29 for turning and untangling the laundry inside the rotating drum 27.

Water tub 25 is connected to water valve 30 that when opened supplies water into water tub 25. Water tub 25 is further connected to drain hose 32 having drain valve 31 that when opened, drains the water inside water tub 25.

Below water tub 25, airflow duct 33 is provided that extends in the front and rear direction. The front end of airflow duct 33 communicates into water tub 25 through front duct 34, whereas the rear end communicates into water tub 25 through rear duct 35. At the rear end of airflow duct 33, blower fan 36 is provided which causes the air within water tub 25 to flow from front duct 34 into airflow duct 33 and circulated back into water tub 25 through rear duct 35.

Figure 4:
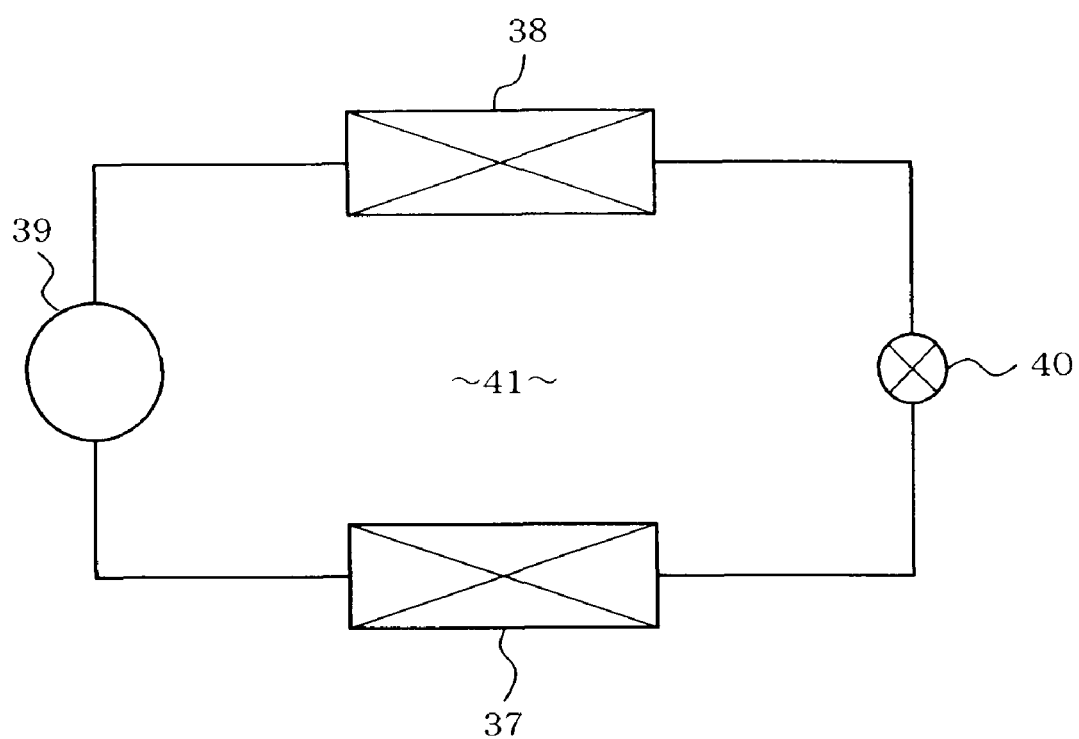
FIG. 4 illustrates the configuration of a heat pump.

At the forward interior of airflow duct 33, evaporator 37 is provided whereas condenser 38 is provided at the rear interior. Evaporator 37 and condenser 38 along with compressor 39 and check valve 40 constitute heat pump 41 as shown in FIG. 4 in which the air flowing within airflow duct 33 is dehumidified by evaporator 37 and heated by condenser 38 to be circulated back into water tub 25. Check valve 40 comprises an expansion valve which can be opened in controlled amounts.

On the front face of exterior housing 22 above door 24, control panel 42 configured by a microcomputer is provided that is connected to control circuitry not shown that controls the overall operation of drum washer dryer 21. Control circuitry executes various operational courses through control of components such as permanent magnet motor 1, water valve 30, drain valve 31, compressor 39, and check valve 40 according to the settings made through control panel 42. Though not shown, the compressor motor provided at compressor 39 is configured substantially the same as permanent magnet motor 1.

Figure 2A:
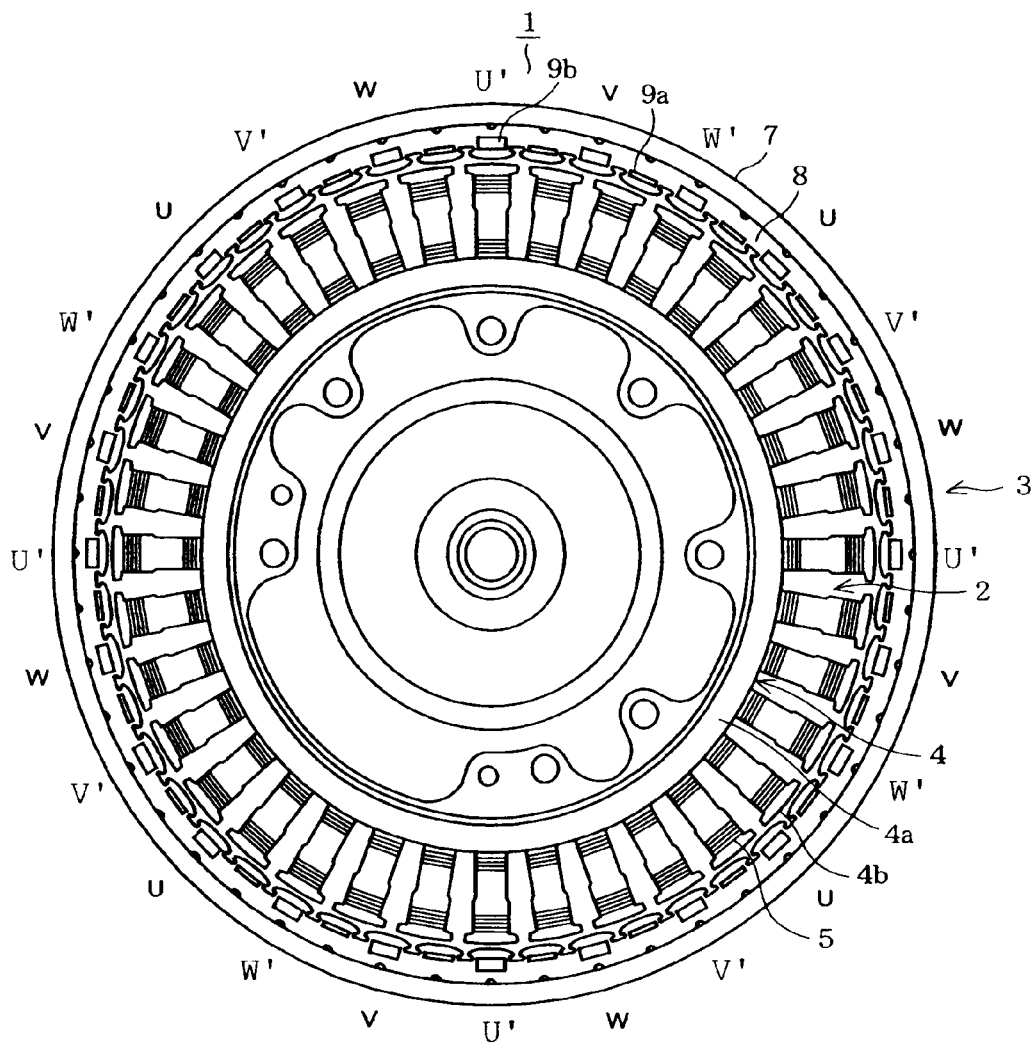
FIG. 2A is a plan view of a rotor of a permanent magnet motor.
Figure 2B:
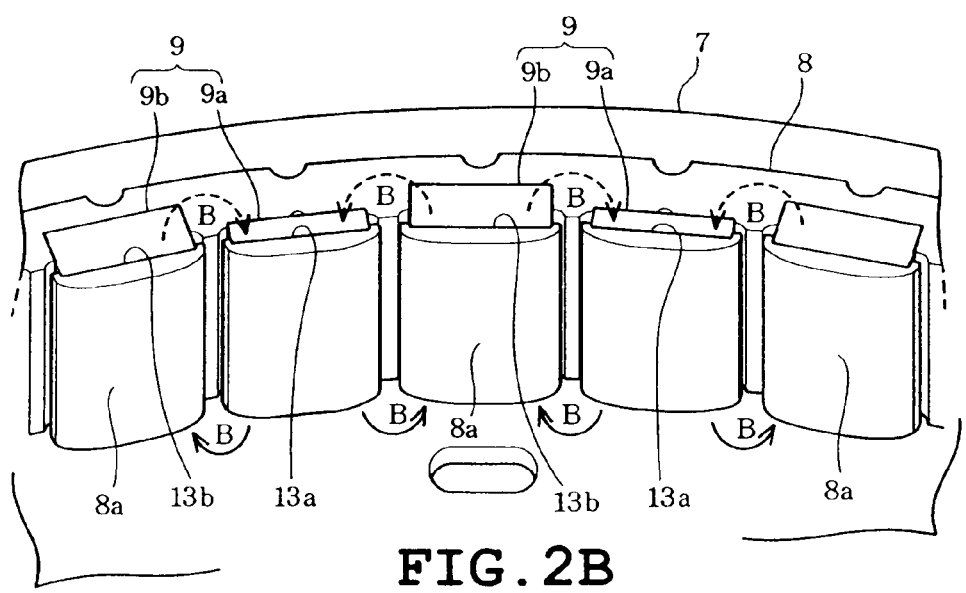
FIG. 2B is a partial perspective view of the rotor.

FIG. 1 is a block diagram describing the configuration of motor controller 50 that control the rotation of permanent magnet motor 1 by way of field oriented control or vector control. The compressor motor is also controlled in a similar fashion. In a field oriented control, current flowing in armature winding is divided into the direction of magnetic flux of the permanent magnet serving as the field and the direction orthogonal to the direction of magnetic flux and are controlled independently to allow control of magnetic flux and generated torque. Current control is executed through current parameters represented in d-q coordinate system which is a coordinate system that rotates with rotor 3 of motor 1. D-axis represents the direction of magnetic flux generated by the permanent magnet mounted on rotor 3 and q-axis represents the direction orthogonal to the d-axis. Among the current flowing in the windings, q-axis current Iq representing the q-axis component is a torque component current that generates rotational torque, whereas d-axis current Id representing d-axis component is an excitation or magnetization current component that generates magnetic flux.

Current sensors 51U, 51V, and 51W sense currents Iu, Iv, and Iw flowing in each of the three phases, that is, U-phase, V-phase, and W-phase of motor 1. Of note is that the U-phase, V-phase, and W-phase are also described as U', V', and W' when distinction is required such as in FIG. 2. Currents Iu, Iv, and Iw may be detected by replacing current sensor 51 with a configuration in which three shunt resistors are provided between the switching elements and the ground of the lower arm of inverter circuit 52 and detecting currents Iu, Iv, and Iw based on their terminal voltages.

Currents Iu, Iv, and Iw sensed by current sensor 51 undergo A/D transformation by A/D transformer not shown and is thereafter transformed into two-phase currents Iα and Iβ by uvw/dq coordinate transformer 53 to be further transformed into d-axis current Id and q-axis current Iq. The symbols α and β represent the coordinate axis of the dual axis coordinate system fixed to stator 2 of motor 1. In the calculation for coordinate transformation, rotation position estimate θ of rotor, in other words, the estimate phase difference between α-axis and β-axis, estimated by speed/position estimator 54 is used. The calculation further produces an output of rotational speed or angular speed ω of motor 1 estimated by speed/position estimator 54.

Speed/position estimator 54 estimates angular speed ω of motor 1 and rotary position θ of rotor. Speed/position estimator 54 stores circuit constant, in other words, motor constant of motor 1 such as d-axis inductance Ld, q-axis inductance Lq of armature winding and winding resistance R and receives input of d-axis current Id, q-axis current Iq and d-axis output voltage command Vd. Speed/position estimator 54 estimates rotational speed ω motor 1 using d-axis motor voltage equation represented below as equation (1).

$$Vd = R \cdot Id - \omega \cdot Lq \cdot Iq \tag{1}$$

Further, angular speed ω is integrated by integrator 55 and the result of integration is outputted as rotational position estimate θ.

Induced voltage detector 56 estimates induced voltage Eq of the motor 1 by the q-axis motor voltage equation represented as (2).

$$Vq = R \cdot Iq + \omega \cdot Ld \cdot Id + Eq \tag{2}$$

That is, induced voltage Eq is obtained by: d-q axis currents Id and Iq calculated by uvw/dq coordinate transformer 53; q-axis output voltage command Vq outputted by later described current controller 61; rotational speed estimate u calculated by speed/position estimator 54; winding resistance R determined by motor 1; and d-axis inductance Ld.

Figure 10:
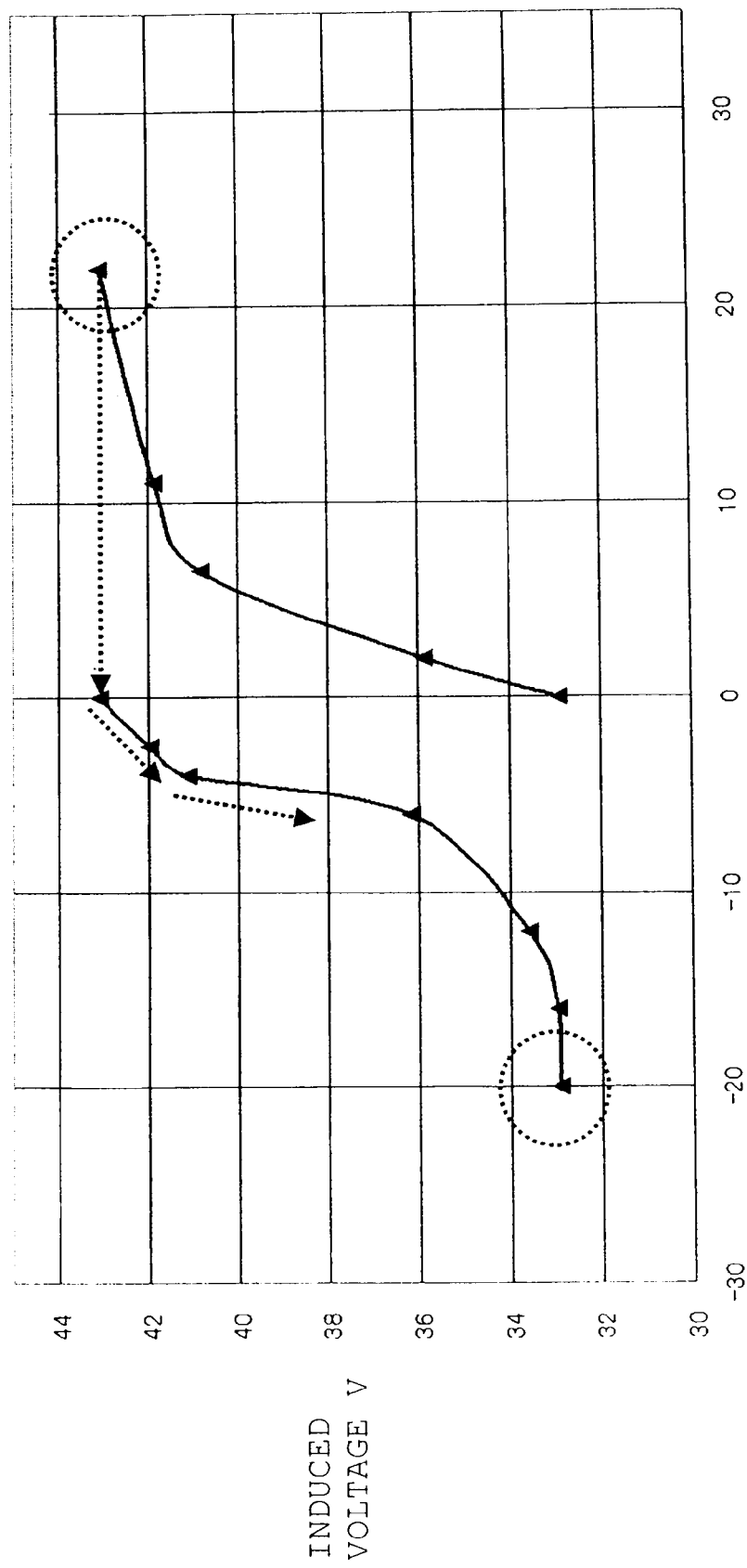
FIG. 10 is a descriptive view of a problem encountered in related art.

Induced voltage command determiner 57 outputs induced voltage output command Eq_ref that is optimal for executing wash and dry operations by the washing machine. When employing motor 1 having a magnetizing/demagnetizing characteristics as shown, for example in FIG. 10, Eq_ref is specified at 43V in executing wash operation because it provides improved efficiency when the induced voltage is maximized, whereas Eq_ref is specified at 33V in executing dehydrate operation because it provides improved efficiency when the induced voltage is minimized.

Demagnetization detector 58 compares E_ref determined by induced voltage command determiner 57 and the current induced voltage Eq detected by induced voltage detector 56, and if Eq_ref>Eq, makes a determination that demagnetization has occurred.

Magnetization controller 59 outputs magnetization current command Id_com2 in order to increase or decrease the magnetization of the motor depending on its operation status in the following three cases: (1) when increasing/decreasing magnetization depending on the operation status of the washing machine; (2) when detecting decrease in magnetization at demagnetization detector 58; (3) when occurrence of demagnetization has been determined by the size of motor current (q-axis current Iq). $Id_{13}$ com2 takes a positive value when increasing magnetization and a negative value when decreasing magnetization. Further, based on energization position command θ issued when the rotor is in rotation, magnetization controller 59 further outputs an energization command twice every 360 electrical angle, with each energization period lasting from few milliseconds to tens of milliseconds.

Magnetization controller 59 outputs magnetizing current command Id_com2, for magnetizing alnico magnet 9b determined based on the above obtained phase θ and rotational speed ω, to accumulator 60 or adder 60. Accumulator 60 outputs the sum of magnetizing current command Id_com2 and field weakening current command Id_com1 to current controller 61 as d-axis current command Id_ref. Further, rotation count command ω_ref given from external components is reduced by rotational speed ω by subtractor 62 to calculate the difference, which difference is proportionally integrated at proportional integrator 63 to be outputted to current controller 61 as q-axis current command Iq_ref.

Current controller 61 obtains the difference between d-axis current command Id_ref and d-axis current Id and the difference between q-axis current command Iq_ref and q-axis current Iq through subtractor 64d and subtractor 64q, respectively, which differences are proportionally integrated at proportional integrators 65d and 65q, respectively. The result of proportional integration is outputted to dq/uvw coordinate transformer 66 as output voltage commands Vd and Vq represented by d-q coordinate system. Then, at dq/uvw coordinate transformer 66, voltage commands Vd and Vq are transformed into α-β coordinate system based representation and are thereafter further transformed into phase voltage commands Vu, Vv, and Vw. Of note is that a later described magnetic pole position θ is used in the calculation of coordinate transformation of dq/uvw coordinate transformer 66.

Phase voltage commands Vu, Vv, and Vw are inputted to power converter 67 to generate pulse-width modulated gate drive signal for supplying voltage that equals the command value. Inverter circuit 52 comprises a three-phase bridge configuration of switching elements such as IGBT (Insulated Gate Bipolar Transistor) and receives supply of direct current voltage from a direct current power supply circuit not shown. The gate drive signal generated by power transformer 67 is given to the gates of the switching elements constituting inverter circuit 52 whereby a three-phase AC (Alternating Current) voltage being modulated in pulse width to conform to phase voltage commands Vu, Vv, and Vw are generated to be applied on stator winding 5 of motor 1.

In the above described configuration, a feedback control by PI (Proportional Integration) calculation is executed at current controller 61 so that d-axis current Id, q-axis current Iq equals d-axis current command Id_ref and q-axis current command Iq_ref, respectively. Angular speed estimate ω, which is the result of the control, is fed back to subtractor 62 and error Δω converges to zero by the proportional integration by proportional integrator 63. Rotational speed ω thus, conforms to command speed ωref.

In the above described configuration, motor controller 50 taken together with permanent magnet motor 1 constitutes motor control system 70. Components exclusive of inverter circuit 52 and PWM generator 62 are configured by software implemented on microcomputer of motor controller 50. Among the components implemented by software components, the components exclusive of induced voltage detector 56, induced voltage command determiner 57, demagnetization detector 58, and magnetization controller 59 constitute the components responsible for field oriented control.

Next a description will be given on the operation of drum washer dryer 21 simply referred to as washing machine provided with a permanent magnet motor 1. When motor controller 50 energizes stator winding 5 through inverter circuit 52, armature counteraction generates external magnetic field, that is, a magnetic field generated by current flowing in stator winding 5, that is operated on permanent magnets 9a and 9b of rotor 3. Among permanent magnets 9a and 9b, magnetization of less coercive alnico magnet 9b is either reduced or increased by the aforementioned external magnetic field generated by armature counteraction operated on it to consequently increase or reduce the amount of magnetic flux or linked magnetic flux linked to stator winding 5. Thus, in the present exemplary embodiment, motor controller 50 switches the level of magnetization of alnico magnet 9b depending upon the operational modes such as wash, dehydrate, and dry steps through control of energization of stator winding 5.

In the wash step, the control circuitry of washer 21 opens water valve 30 to supply water into water tub 25 and thereafter rotates drum 27 to perform the wash. The wash step requires high torque to rotate drum 27 for turning wet laundry with baffle 29 but does not require high speed. Thus, motor controller 50 controls energization of stator winding 5 by inverter circuit 52 through magnetization controller 58 so that alnico magnet 9b is increased in magnetic force. Thus, increased amount of magnetic flux or increased magnetic force is operated on stator winding 5 to rotate drum 27 at high torque and low speed.

In the dehydrate step, control circuitry opens drain valve 31 to drain water tub 25 and rotates drum 27 at high speed to dehydrate moisture from laundry. The dehydrate step requires drum 27 to be rotated at high speed in order to improve dehydrate efficiency but does not require high torque. Thus, control circuitry controls energization of stator winding 5 by inverter circuit 52 so that alnico magnet 9b is reduced in magnetism. Thus, reduced amount of magnetic flux or reduced magnetic force is operated on stator winding 5 to rotate drum 27 at low torque and high speed.

Finally, in the dry step, control circuitry activates blower fan 36 and heat pump 41 and rotates drum 27 for drying the laundry. In the dry step, motor controller 50 controls energization of stator winding 5 by inverter circuit 52 so that magnetism of alnico magnet 9b is increased in preparation for the subsequent cycle of the wash step. Thus, the amount of magnetic flux to be operated on stator winding 5 can be increased to facilitate high-torque low-speed rotation of drum 27 in the wash step of the next cycle.

Figure 5B:
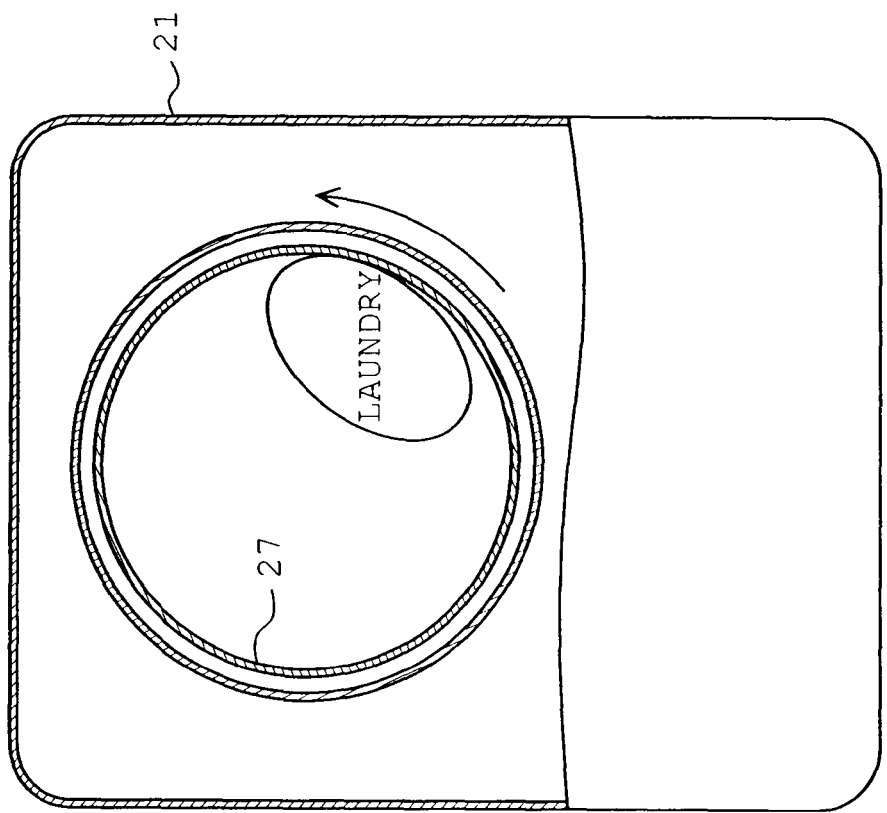
FIGS. 5A and 5B schematically illustrate how laundry within the drum changes its position during a wash operation.
Figure 5A:
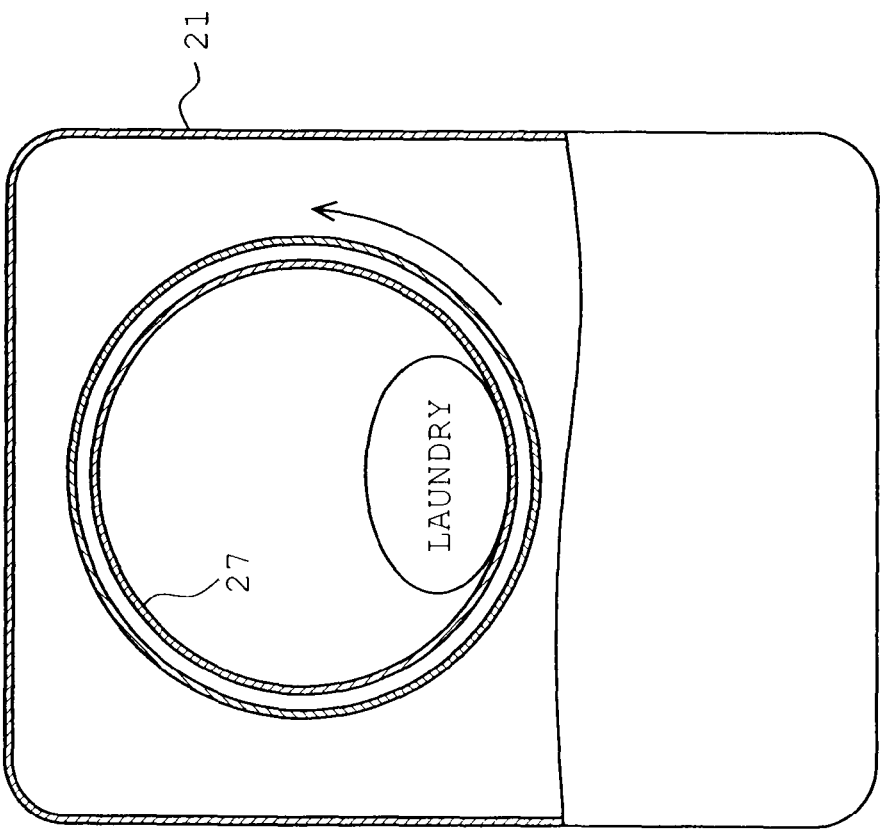

As described above, the wash operation requires large torque for rotating wet laundry. FIG. 5 schematically illustrates how the laundry inside drum 27 changes its position during the wash operation. At the start of drum 27 rotation, laundry sits at the lower most position inside drum 27 as shown in FIG. 5A. Maximum torque is required when the laundry is lifted by baffle 29 to the position shown in FIG. 5B. Further, when the count of rotation of drum 27 reaches a constant rotation count of for instance, 50 rpm, the rotation count continues the operation for a predetermined time period while maintaining the rotation count. Because laundry continues its revolution within drum 27 when drum 27 rotates at constant rotation count, required torque is less as compared to activation. This means that during the wash operation, torque is maximized when motor 1 is running in the state shown in FIG. 5B after starting its motion from the stopped state.

FIGS. 6A, 6B, and 6C collectively exhibit the relation between: rotation count and torque during the wash operation; torque current Iq; and amount of magnetic flux of motor 1, in other words, induced voltage constant indicating the induced voltage per unit rotation count. As indicated in broken line in FIG. 6A, large torque occurs when activated in the forward and reverse directions and thus, torque current Iq increases accordingly. When torque current Iq in the level of 10 A flows at activation, alnico magnet 9b is demagnetized according to the magnetization/demagnetization property shown in FIG. 10 to reduce the induced voltage of motor 1 as shown in FIG. 6C.

Next a description will be given on the behavior of the control when demagnetization occurs during the wash operation as shown in FIGS. 6A, 6B and 6C. Demagnetization detector 58 determines demagnetization of motor 1 when encountering the following two cases: (1) induced voltage Eq currently detected by induced voltage detector 56 is reduced by predetermined percentage or amount from induced voltage command Eq_ref issued prior to the wash operation; (2) torque current Iq detected by current detector 51 and subjected to d-q transformation exceeds a predetermined value such as 6 A. The determination is made based on a table which may be prepared by collecting information on amount of current flow versus demagnetized induced voltage for each motor type as such exemplified in the magnetization/demagnetization properties indicated in FIG. 10.

Then, demagnetization detector 58, when detecting demagnetization, further proceeds to output magnetization command to magnetization controller 59 when one or more of the following five conditions have been met.

Condition 1: When detected torque current Iq exceeds a predetermined value of 6 A for example, and thereafter falls below the predetermined value.

To elaborate, occurrence of demagnetization is determined at the moment when torque current Iq exceeds the predetermined value. Then, demagnetization detector 58 stands by until the period/timing for outputting high torque such as activation is over. This is because even if magnetization is increased in response to decrease in torque Iq current encountered before outputting high torque, demagnetization detector 58 may soon encounter another occurrence of demagnetization. Thus, condition 1 prevents increase in magnetization prior to output of high torque required in exerting activation load, for example.

Condition 2: When motor 1 is rotating at constant rotation count during wash or rinse operation.

To elaborate, by increasing magnetization after motor 1 reaches the constant rotation count of 50 rpm, increase in magnetization prior to output of high torque required for exerting activation load can be prevented as was the case in condition 1.

Condition 3: When percentage of variation or range of variation in amplitude of torque current Iq is equal to or less than a predetermined value.

To elaborate, magnetization is increased when torque current Iq is not subjected to large variation after reaching the constant rotation speed. This condition is applied because there is a possibility of encountering decrease in magnetization even when magnetization is increased after period/timing of activation load is over if torque current Iq is subjected to large variation ranging, for example, from 3 A to 10 A.

Condition 4: When the average of amplitude of torque current Iq within a predetermined time period is equal to or less than a predetermined value.

Condition 4 applies because if torque current Iq maintains an average of 6 A for given period of time, for instance, it is an indication that motor 1 is continually subjected to extremely heavy load and thus, increase in magnetization carried out under such time period may soon be followed by demagnetization.

Condition 5: When duration of drum rotation during wash or rinse operation is equal to or more than a predetermined time period of 10 seconds, for example.

Condition 5 applies because when duration of forward/reverse rotation of drum 27 is too short and the rotation is stopped immediately after the period for outputting high torque required for exerting activation load, there would be no opportunity for increasing magnetization.

Magnetization is increased under the above described conditions for the following reasons. Firstly, noise is emitted whenever energization takes place through magnetization during the wash operation and thus, frequent energization reduces product quality of the washing machine. Secondly, magnetization causes large current flow in the switching elements of inverter circuit 52. Thus, by reducing the frequency of magnetization, the switching elements are subjected to less burden and thus, their life increases. The present exemplary embodiment presumes maximum of approximately 8 A of current flow for driving motor 1 and approximately 20 A of current flow for magnetizing alnico magnet 9b.

The sequence of recovery from demagnetization based on these conditions will be described along with its effects shown in FIGS. 7A, 7B, and 7C. When demagnetization detector 58 detects demagnetization of alnico magnet 9b by torque current Iq outputted at the time of activation, magnetization controller 59 increases magnetization to recover from demagnetization as shown in FIG. 7C at timings indicated by FIG. 7B based on the above described conditions in order to reduce electricity consumption.

FIG. 7A represents by symbol I a certain stage within the wash operation when the motor maintains a constant rotation count.

FIG. 7B represents by symbol II a threshold of torque current Iq which triggers demagnetization in alnico magnet 9b; and by symbol IV a variation range of torque current Iq during I.

FIG. 7C represents by symbol III the period in which decrease in motor magnetic flux is detected.

Further, FIGS. 8A and 8B are charts showing cases in which magnetization of permanent magnet 9 is permitted under the present exemplary embodiment. FIG. 8A indicates the permitted case when laundry load is 4 kg, whereas FIG. 8B indicates the permitted cases when laundry load is 9 kg. Both charts employ condition 5 in determining the permission of magnetization. For instance, when laundry load is 4 kg as indicated in FIG. 8A, less time is expended in forward/reverse rotation of drum 27, and apart from "first wash" which lasts for 20 seconds, the duration of the remaining steps peaks at "water supply/agitate" which only lasts for 5.2 seconds. Magnetization is permitted only at "first wash" and the rest of the steps do not permit magnetization because drum 27 only rotates for a short period of time. In case when laundry load is 9 kg as indicated in FIG. 8B on the other hand, all of the steps last 10 seconds or more with the exception of "drain" which only lasts for 5 seconds. In this case, magnetization is permitted in all of the steps except for "drain".

According to the above described exemplary embodiment, magnetization controller 59, when demagnetization of alnico magnet 9b is detected by demagnetization detector 58 during the operation of motor 1, recuperates magnetic force by increasing the magnetization of alnico magnet 9b. Demagnetization detector 58 compares induced voltage command Eq_ref determined by induced voltage command determiner 57 based on the operational status of motor 1 with induced voltage Eq detected by induced voltage detector 56, and detects demagnetization of alnico magnet 9b when the detected induced voltage Eq is reduced by a predetermined percentage or value relative to induced voltage command Eq_ref. The above described configuration allows reliable detection of demagnetization.

Magnetization controller 59, when detecting demagnetization of alnico magnet 9b by demagnetization detector 58, proceeds to increase magnetization when q-axis current Iq of motor 1 exceeds a predetermined value and thereafter falls below the predetermined value. Thus, magnetization can be increased after motor 1 has outputted high torque at activation when there is less possibility of encountering another demagnetization.

Further, magnetization controller 59, when detecting demagnetization of alnico magnet 9b by demagnetization detector 58, increases magnetization of alnico magnet 9b when percentage of variation or range of variation in amplitude of torque current Iq is equal to less than a predetermined value or when the average of amplitude of torque current Iq within a predetermined time period is equal to or less than a predetermined value. Thus, magnetization can be increased when there is relatively less variation in q-axis current Iq and when there is less possibility of encountering another demagnetization.

Yet, further, drum washer dryer 21 has been configured by motor control system 70 comprising permanent magnet motor 1 and motor controller 50 so as to execute the washing machine operation by rotating drum 27 by permanent magnet motor 1. Thus, the wash and other operations can be executed uninterruptedly by recuperating the magnetic force of alnico magnet 9b which was demagnetized during the operation of motor 1 to prevent degradation of motor efficiency. Demagnetization detector 58 detects demagnetization of alnico magnet 9b when the maximum value of q-axis current Iq detected upon activation of motor 1 at the time of starting the wash or the rinse operation exceeds a predetermined value. Thus, demagnetization can be detected when the load of the washing machine operation is relatively high and during which period there is high possibility of demagnetization of alnico magnet 9b.

Still further, magnetization controller 59, when demagnetization of alnico magnet 9b has been detected by demagnetization detector 58, increases magnetization of alnico magnet 9b when rotational speed of motor 1 becomes constant during the wash or rinse operation or when motor 1 is rotated in one direction for a predetermined time period or more. Thus, magnetization can be increased when load variance is relatively less and motor 1 is rotating steadily in which state there is less possibility of encountering another demagnetization.

Figure 9:
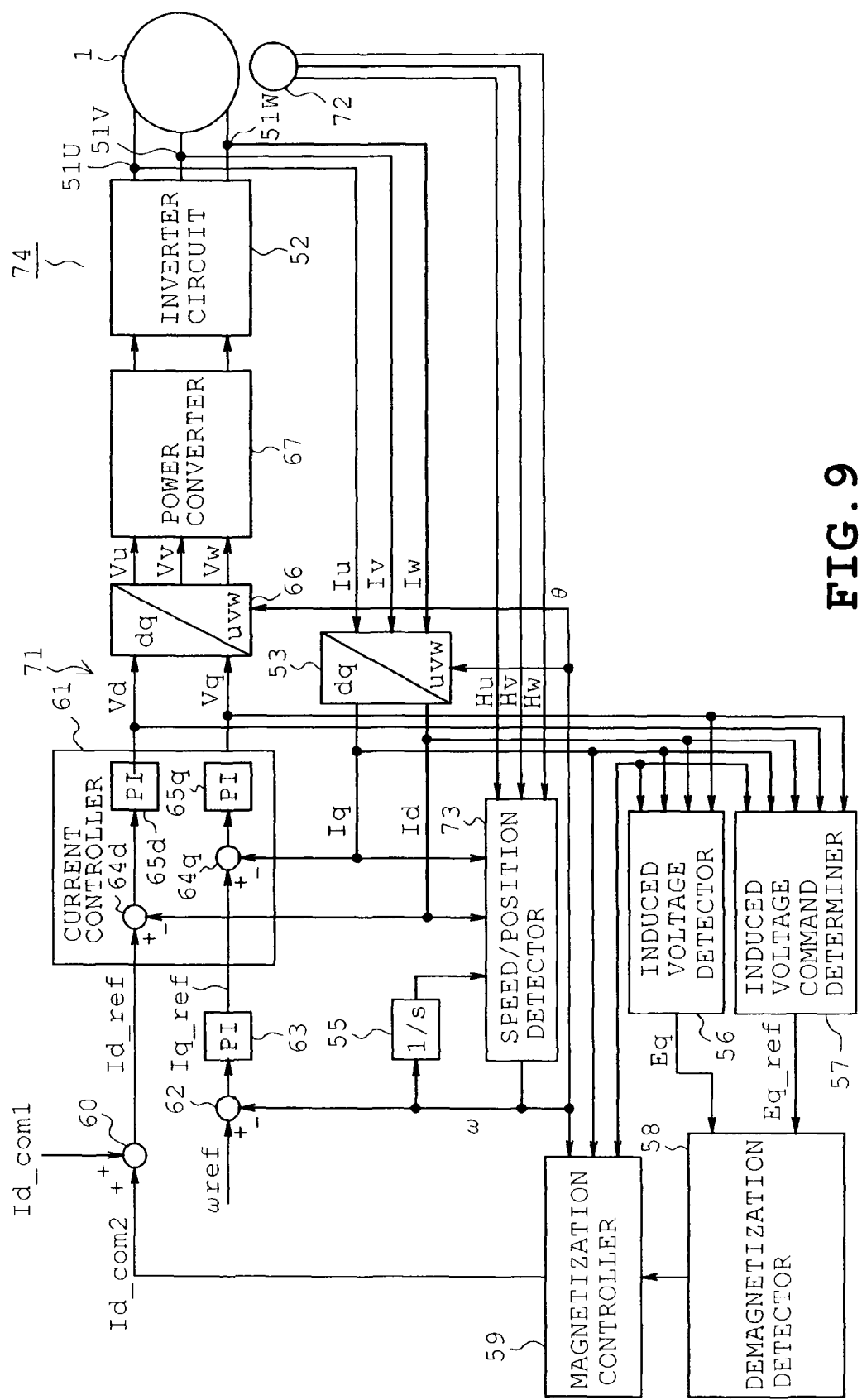
FIG. 9 corresponds to FIG. 1 and illustrates a second exemplary embodiment.

FIG. 9 illustrates a second exemplary embodiment of the present disclosure. The elements that are identical to the first exemplary embodiments are identified with identical reference symbols and description will be given only on elements that differ. Motor controller 71 according to the second exemplary embodiment differs from the first exemplary embodiment in that position sensors 72u, 72v, and 72w comprising Hall IC, for example, are disposed at motor 1 and speed/position estimator 54 is replaced by speed position detector 73. Motor 1 and motor controller 71 constitute motor controls system 74.

Speed/position detector 73 detects rotational speed ω and rotational position θ of motor 1 based on position signals Hu, Hv, and Hw given by position sensor 72. The resulting operation, effect etc. are the same as those of the first exemplary embodiment.

The present invention is not limited to the above described and shown exemplary embodiments but may be modified or expanded as follows.

The high coercivity permanent magnet and the low coercivity permanent magnet are not limited to alnico magnet 9b and neodymium magnet 9a, respectively but may be replaced by permanent magnets made of any material that provides appropriate magnetism. Further, if the required output properties can be obtained by increasing/decreasing magnetization of the low coercivity permanent magnet, the high coercivity permanent magnet may be eliminated.

The present invention may be applied to permanent magnet motors that are configured as disclosed in the aforementioned JP 2006-280195 A.

The present invention is not limited to application to washer dryer 21 or washing machines without dry features but may be applied to any appliances that employ a permanent magnet motor that is provided with a low coercivity magnet at its rotor and that is desirable to modify the output properties of the motor depending upon variation in load.

The foregoing description and drawings are merely illustrative of the principles of the present disclosure and are not to be construed in a limited sense. Various changes and modifications will become apparent to those of ordinary skill in the art. All such changes and modifications are seen to fall within the scope of the disclosure as defined by the appended claims.

What is claimed is:

1. A motor controller, comprising:
a vector controller that controls a permanent magnet motor including a rotor being provided with a permanent magnet having a coercivity low enough to allow modification in amount of magnetization and that executes a vector control by detecting current flowing at the permanent magnet motor;
a speed/position detector that detects a rotational speed and a rotational position of the permanent magnet motor;
a magnetization controller that increases or decreases the magnetization of the permanent magnet depending on the rotational position of the permanent magnet motor through adjustment in status of the magnetization of the permanent magnet by way of armature counteraction;
a demagnetization detector that detects a decrease in the magnetization of the permanent magnet magnetized by the magnetization controller during operation of the permanent magnet motor;
an induced voltage command determiner that determines an induced voltage command that is optimal for operational status of the permanent magnet motor; and
an induced voltage detector that detects an induced voltage occurring at the permanent magnet motor by calculation;
wherein the demagnetization detector detects the decrease in the magnetization of the permanent magnet by comparing the induced voltage command and the detected induced voltage and judging that the detected induced voltage is reduced by a predetermined percentage or predetermined value relative to the induced voltage command.

2. The motor controller according to claim 1, wherein the magnetization controller, when the decrease in the magnetization of the permanent magnet is detected by the demagnetization detector, increases the magnetization of the permanent magnet when a q-axis current of the permanent magnet motor is reduced below a predetermined value after having exceeded the predetermined value.

3. The motor controller according to claim 1, wherein the magnetization controller, when the decrease in the magnetization of the permanent magnet is detected by the demagnetization detector, increases the magnetization of the permanent magnet when a variation percentage or a variation range of a q-axis current amplitude of the permanent magnet motor is equal to or less than a predetermined value.

4. The motor controller according to claim 1, wherein the magnetization controller, when the decrease in the magnetization of the permanent magnet is detected by the demagnetization detector, increases the magnetization of the permanent magnet when an average of a q-axis current amplitude within a predetermined time period is equal to or less than a predetermined value.

5. A drum washing machine, comprising:
  a permanent magnet motor including a rotor being provided with a permanent magnet having a coercivity low enough to allow modification in amount of magnetization, and
  a motor controller including:
    a vector controller that controls the permanent magnet motor and that executes a vector control by detecting current flowing at the permanent magnet motor;
  a speed/position detector that detects a rotational speed and a rotational position of the permanent magnet motor;
    a magnetization controller that increases or decreases the magnetization of the permanent magnet depending on the rotational position of the permanent magnet motor through adjustment in status of the magnetization of the permanent magnet by way of armature counteraction; and
    a demagnetization detector that detects a decrease in the magnetization of the permanent magnet magnetized by the magnetization controller during operation of the permanent magnet motor;
  wherein a washing operation is executed by rotating a drum containing laundry by a rotational drive force generated by the permanent magnet motor, and
  wherein the demagnetization detector detects the decrease in the magnetization of the permanent magnet when a maximum value of a q-axis current at activation of the permanent magnet motor for starting a wash or a rinse step exceeds a predetermined value.

6. The drum washing machine according to claim 5, wherein the magnetization controller, when the decrease in the magnetization of the permanent magnet is detected by the demagnetization detector, increases the magnetization of the permanent magnet when the rotational speed of the permanent magnet motor is constant during a wash or a rinse step.

7. The drum washing machine according to claim 5, wherein the magnetization controller, when the decrease in the magnetization of the permanent magnet is detected by the demagnetization detector, increases the magnetization of the permanent magnet when the permanent magnet motor is rotated in one direction for a predetermined time period or more during a wash or a rinse step.

8. The drum washing machine according to claim 5, wherein the magnetization controller, when the decrease in the magnetization of the permanent magnet is detected by the demagnetization detector, increases the magnetization of the permanent magnet when a q-axis current of the permanent magnet is reduced below a predetermined value after having exceeded the predetermined value.

9. The drum washing machine according to claim 8, wherein the magnetization controller, when the decrease in the magnetization of the permanent magnet is detected by the demagnetization detector, increases the magnetization of the permanent magnet when the rotational speed of the permanent magnet motor is constant during a wash or a rinse step.

10. The drum washing machine according to claim 8, wherein the magnetization controller, when the decrease in the magnetization of the permanent magnet is detected by the demagnetization detector, increases the magnetization of the permanent magnet when the permanent magnet motor is rotated in one direction for a predetermined time period or more during a wash or a rinse step.

11. The drum washing machine according to claim 5, wherein the magnetization controller, when the decrease in the magnetization of the permanent magnet is detected by the demagnetization detector, increases the magnetization of the permanent magnet when a variation percentage or a variation range of a q-axis current amplitude of the permanent magnet motor is equal to or less than a predetermined value.

12. The drum washing machine according to claim 11, wherein the magnetization controller, when the decrease in the magnetization of the permanent magnet is detected by the demagnetization detector, increases the magnetization of the permanent magnet when the rotational speed of the permanent magnet motor is constant during a wash or a rinse step.

13. The drum washing machine according to claim 11, wherein the magnetization controller, when the decrease in the magnetization of the permanent magnet is detected by the demagnetization detector, increases the magnetization of the permanent magnet when the permanent magnet motor is rotated in one direction for a predetermined time period or more during a wash or a rinse step.

14. The drum washing machine according to claim 5, wherein the magnetization controller, when the decrease in the magnetization of the permanent magnet is detected by the demagnetization detector, increases the magnetization of the permanent magnet when an average of a q-axis current amplitude within a predetermined time period is equal to or less than a predetermined value.

15. The drum washing machine according to claim 14, wherein the magnetization controller, when the decrease in the magnetization of the permanent magnet is detected by the demagnetization detector, increases the magnetization of the permanent magnet when the rotational speed of the permanent magnet motor is constant during a wash or a rinse step.

16. The drum washing machine according to claim 14, wherein the magnetization controller, when the decrease in the magnetization of the permanent magnet is detected by the demagnetization detector, increases the magnetization of the permanent magnet when the permanent magnet motor is rotated in one direction for a predetermined time period or more during a wash or a rinse step.

17. A motor controller, comprising:
  a vector controller that controls a permanent magnet motor and that executes a vector control by detecting current flowing at the permanent magnet motor;
  a speed/position detector that detects a rotational speed and a rotational position of the permanent magnet motor;
  a magnetization controller that increases or decreases the magnetization of the permanent magnet depending on the rotational position of the permanent magnet motor through adjustment in status of the magnetization of the permanent magnet by way of armature counteraction; and a demagnetization detector that detects a decrease in the magnetization of the permanent magnet magnetized by the magnetization controller during operation of the permanent magnet motor;

wherein the demagnetization detector detects the decrease in the magnetization of the permanent magnet when a maximum value of a q-axis current at activation of the permanent magnet motor exceeds a predetermined value.

18. The motor controller according to claim 17, wherein the magnetization controller, when the decrease in the magnetization of the permanent magnet is detected by the demagnetization detector, increases the magnetization of the permanent magnet when a q-axis current of the permanent magnet motor is reduced below a predetermined value after having exceeded the predetermined value.

19. The motor controller according to claim 17, wherein the magnetization controller, when the decrease in the magnetization of the permanent magnet is detected by the demagnetization detector, increases the magnetization of the permanent magnet when a variation percentage or a variation range of a q-axis current amplitude of the permanent magnet motor is equal to or less than a predetermined value.

20. The motor controller according to claim 17, wherein the magnetization controller, when the decrease in the magnetization of the permanent magnet is detected by the demagnetization detector, increases the magnetization of the permanent magnet when an average of a q-axis current amplitude within a predetermined time period is equal to or less than a predetermine value.

* * * * *